F. H. CLOUGH.
SHAFT BEARING.
APPLICATION FILED FEB. 5, 1910.

1,019,424.

Patented Mar. 5, 1912.

Witnesses:

Inventor
Frederick H. Clough,
by
His Attorney.

UNITED STATES PATENT OFFICE.

FREDERICK H. CLOUGH, OF RUGBY, ENGLAND, ASSIGNOR TO GENERAL ELECTRIC COMPANY, A CORPORATION OF NEW YORK.

SHAFT-BEARING.

1,019,424.  Specification of Letters Patent.  Patented Mar. 5, 1912.

Application filed February 5, 1910. Serial No. 542,204.

*To all whom it may concern:*

Be it known that I, FREDERICK H. CLOUGH, a subject of the King of Great Britain, residing at Rugby, England, have invented certain new and useful Improvements in Shaft-Bearings, of which the following is a specification.

My invention relates to shaft bearings, and more particularly to bearings for such shafts as are required to rotate at a high speed.

The critical speed of a shaft is the speed which is equal to the frequency of elastic vibration of the shaft, or is the speed at which the centrifugal force due to a small displacement or bending of the shaft is always equal to the restoring force due to the elasticity of the shaft however great the displacement may be. Machines whose normal speed of rotation is higher than the critical speed of the shaft have necessarily to pass through the critical speed, and my invention has for its object to prevent the occurrence of excessive vibration when doing this.

According to my invention, I construct a bearing somewhat after the form of the usual self-alining bearings, in which the inner portion, or bearing proper, is movable relatively to the outer portion or bearing casing, but I so construct the inner portion that besides being capable of slight movement for alining purposes, the inner portion is also capable of a slight circular motion should the shaft have any tendency to vibrate, this motion, however, being accompanied by a very great frictional force which tends to rapidly damp out the vibrations.

Figure 1:
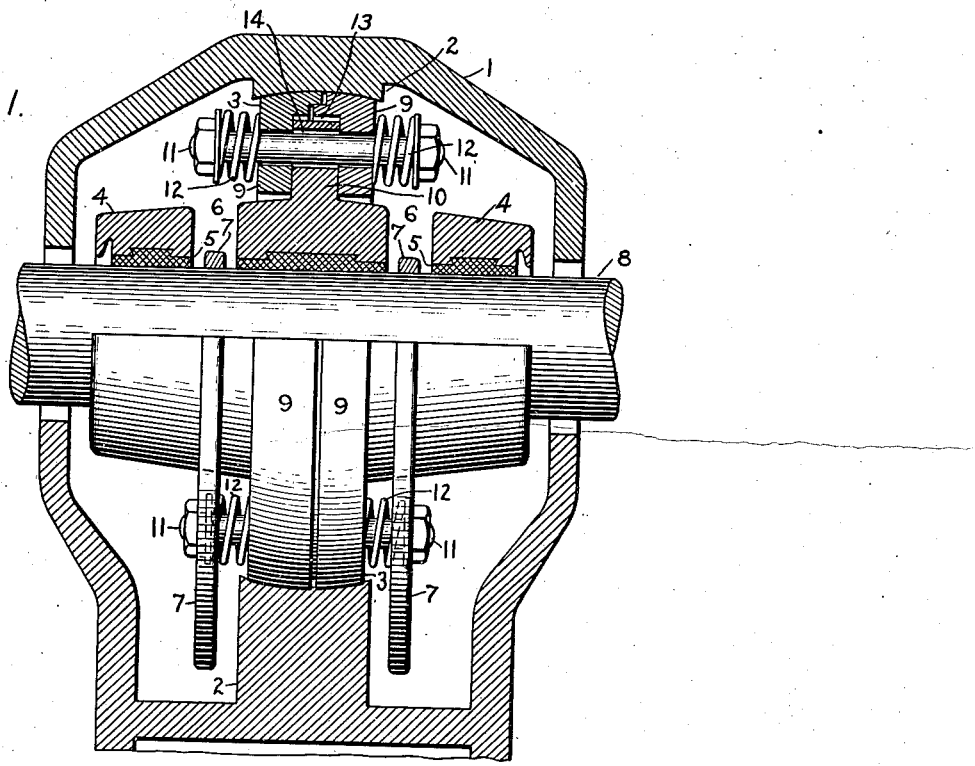
Figure 2:
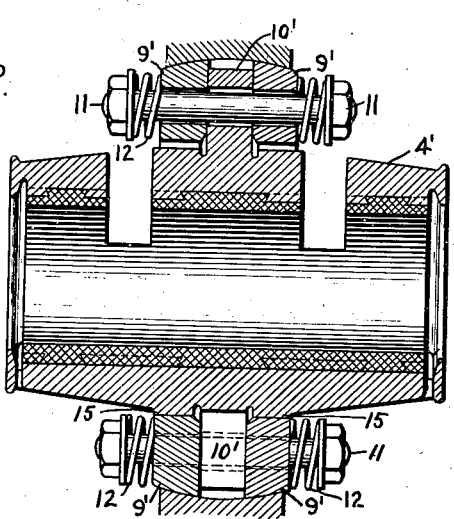

For a better understanding of my invention, reference may be had to the following description, taken in connection with the accompanying drawing, in which Figure 1 is a longitudinal view of a bearing embodying my invention, the top portion of which is in section, and Fig. 2 is a longitudinal section of a modified form of my bearing.

Referring to the drawing, 1 is the outer portion or casing of the bearing having internal spherical seat portions 2 with which the outer spherical surfaces 3 of the inner portion of the bearing coöperate. The inner portion of the bearing consists of a sleeve 4 of cast iron, or other suitable material, provided with a lining 5 of white metal, the sleeve being divided longitudinally in the usual way and provided with transverse slots 6, which allow the oil rings 7 to bear on the shaft 8. The spherical surfaces 3 instead of being formed on a part of the inner portion of the bearing integral therewith as in the usual form of self-alining bearing, is formed on parts 9 separate from the sleeve 4 but clamped thereto in such a manner as to allow of relative movement under pressure between the sleeve 4 and the parts 9. I have shown the parts 9 as rings between the outer portion 1 and the sleeve part 4 which are clamped to a circular flange 10 formed integral with or secured to the sleeve 4. These rings 9 are held together by bolts 11 which also pass through the flange 10 and are pressed toward each other and into contact with the flange by means of springs 12 surrounding the bolts. A small clearance space 13 is left surrounding the flange 10 on the inner portion of the bearing and the bolts securing the rings thereto pass through clearance holes 14 in the flange, so that this flange is free to move slightly in any radial direction between the rings 9, when the force tending to move it is sufficient to overcome the friction between the flange and the rings 10 clamping it.

The clearance space may be filled up for a short distance in one or more places so as to allow the flange to assume a central position under normal running conditions. This is shown in Fig. 2 where the lower portion of the sleeve 4' is provided with bearing strips 15, one on either side of the flange 10'. In this figure I have also shown the rings 9' which form the bearing surface as being only slightly larger in diameter than the circular flange 10', thereby reducing the diameter of the outer casing necessary for inclosing the bearing. The flange 10' instead of being continuous may consist of a number of lugs arranged at intervals around the sleeve, as is clearly seen in the lower part of Fig. 2.

If the rotating member be properly balanced, the bearing such as described above, will remain stationary both below and above the critical speed, but should the shaft tend to whip in passing through the critical speed the forces thrown on the bearing will be sufficient to overcome the friction and will cause it to move in substantially a circular path, and the friction which accompanies the motion will rapidly damp down the vibration and cause the shaft to rotate about its true axis.

I desire it to be understood that my invention is not limited to the particular construction shown and described and I aim in the appended claims to cover all modifications which do not depart from the spirit and scope of my invention.

What I claim as new and desire to secure by Letters Patent of the United States, is,—

1. In a shaft bearing, an outer portion having a spherical seat, an inner portion having a part registering with said spherical seat, and a sleeve part, and means for clamping said parts together so as to allow of relative movement between them under pressure.

2. In a shaft bearing, an outer portion having a spherical seat, an inner portion having a part registering with said spherical seat and a sleeve part having clearance holes therein, and spring pressed bolts passing through said clearance holes for clamping said parts together so as to permit of their relative movement under pressure.

3. In a shaft bearing, an outer portion having a spherical seat, an inner portion having a part registering with said spherical seat and a sleeve part having clearance holes therein, and bolts passing through said clearance holes for clamping said parts together so as to permit of their relative movement under pressure.

4. A shaft bearing comprising an outer portion having a spherical seat, an inner portion having a flange, and rings between which said flange is clamped so as to allow of relative movement under pressure between said rings and said flange, said rings having spherical outer surfaces coöperating with said spherical seat.

5. A shaft bearing comprising an outer portion having a spherical seat, an inner portion having a flange, rings, and bolts arranged to clamp said rings and flange together but allowing them to move relative to one another under pressure, said rings having spherical outer surfaces coöperating with said spherical seat.

6. A shaft bearing comprising an outer portion having a spherical seat, an inner portion having a flange, rings, and spring-pressed bolts for clamping said flange and rings together but allowing them to move relative to one another under pressure, said rings having spherical outer surfaces coöperating with said spherical seat.

7. A shaft bearing comprising an outer portion having a spherical seat, an inner portion having a flange, said flange having clearance holes therein, rings, and spring-pressed bolts passing through said clearance holes for clamping said flange and rings together so as to permit of their relative movement under pressure, said rings having spherical outer surfaces coöperating with said spherical seat.

In witness whereof, I have hereunto set my hand this 18th day of January, 1910.

FREDERICK H. CLOUGH.

Witnesses:
CHARLES H. FULLER,
J. A. FOSTER.